(12) United States Patent
Chen

(10) Patent No.: US 9,166,699 B2
(45) Date of Patent: Oct. 20, 2015

(54) INFRARED RECEPTION CIRCUIT AND INFRARED RECEPTION METHOD

(71) Applicant: I-Fa Chen, New Taipei (TW)

(72) Inventor: I-Fa Chen, New Taipei (TW)

(73) Assignee: I-Fa Chen, New Taipei (TW)

( * ) Notice: Subject to any disclaimer, the term of this patent is extended or adjusted under 35 U.S.C. 154(b) by 111 days.

(21) Appl. No.: 14/015,284

(22) Filed: Aug. 30, 2013

(65) Prior Publication Data

US 2014/0328598 A1    Nov. 6, 2014

(30) Foreign Application Priority Data

May 2, 2013    (TW) .............................. 102115663 A

(51) Int. Cl.
*H04B 10/00* (2013.01)
*H04B 10/60* (2013.01)

(52) U.S. Cl.
CPC ..................................... *H04B 10/60* (2013.01)

(58) Field of Classification Search
USPC .................. 398/202–214, 118–131
See application file for complete search history.

(56) References Cited

U.S. PATENT DOCUMENTS

| | | | | |
|---|---|---|---|---|
| 4,621,374 A * | 11/1986 | Micic et al. | .................. | 398/106 |
| 4,899,388 A * | 2/1990 | Mlodzikowski et al. | ....... | 381/77 |
| 5,053,882 A * | 10/1991 | Yanagidaira | .................. | 386/271 |
| 5,483,367 A * | 1/1996 | Han | .............. | 398/115 |
| 5,596,603 A * | 1/1997 | Haupt et al. | .................. | 375/242 |
| 5,602,669 A * | 2/1997 | Chaki | ........................... | 398/188 |
| 5,818,328 A * | 10/1998 | Anderson et al. | ........ | 340/384.72 |
| 5,926,301 A * | 7/1999 | Hirt | .............................. | 398/185 |
| 6,208,445 B1 * | 3/2001 | Reime | .......................... | 398/106 |
| 6,968,062 B1 * | 11/2005 | Inanaga | ........................... | 381/2 |
| 7,343,015 B2 * | 3/2008 | Lam | ................................. | 381/2 |
| 7,499,462 B2 * | 3/2009 | MacMullan et al. | .......... | 370/401 |
| 7,555,136 B2 * | 6/2009 | Wang | .............................. | 381/380 |
| 7,603,080 B2 * | 10/2009 | Richenstein et al. | ........ | 455/3.06 |
| 8,477,960 B2 * | 7/2013 | Hintzen | .......................... | 381/81 |
| 2004/0157555 A1 * | 8/2004 | Richenstein et al. | ........... | 455/39 |
| 2005/0018857 A1 * | 1/2005 | McCarty et al. | ................ | 381/58 |
| 2005/0130717 A1 * | 6/2005 | Gosieski et al. | ........... | 455/575.2 |
| 2008/0212971 A1 * | 9/2008 | Shaanan et al. | ............... | 398/130 |
| 2010/0022183 A1 * | 1/2010 | Ryle et al. | .................... | 455/3.06 |
| 2014/0073276 A1 * | 3/2014 | Iyer et al. | .................. | 455/179.1 |
| 2014/0328598 A1 * | 11/2014 | Chen | ............................ | 398/118 |

* cited by examiner

*Primary Examiner* — Agustin Bello
(74) *Attorney, Agent, or Firm* — Convergent Law Group LLP

(57) ABSTRACT

An infrared reception circuit and an infrared reception method are provided. The infrared reception circuit includes an infrared receiver for receiving infrared signals and converting the infrared signals into analog signals, an amplifier for amplifying the analog signals, an analog/digital converter for converting the amplified analog signals into digital signals, a digital filter for filtering the digital signals via respective frequency bands, a digital frequency-adjusting demodulator for demodulating the filtered digital signals into digital audio frequency signals, and a digital/analog converter for converting the digital audio frequency signals into analog audio signals. Compared with the prior art, the infrared reception circuit and the infrared reception method require far less elements that are used for receiving infrared signals and can still achieve optimal reception, thereby simplifying processes of manufacture and increasing throughput and good yield as a result.

12 Claims, 6 Drawing Sheets

INFRARED RECEPTION CIRCUIT AND INFRARED RECEPTION METHOD

CROSS-REFERENCE TO RELATED APPLICATIONS

This application claims the benefit of Taiwan Application No. 102115663, filed May 2, 2013, and is incorporated herein by reference.

BACKGROUND OF THE INVENTION

1. Field of the Invention

This invention relates to infrared reception techniques, and, more particularly, to an infrared reception circuit and an infrared reception method.

2. Description of Related Art

With the rapid development of technology, wireless transmission technology is widely applied to information, communication and consumer products. Without being bonded by the physical wires, users are allowed to manipulate these products anytime and anyplace. The wireless transmission technology is also used to transmit audio.

The wireless transmission technology used for transmitting audio includes Bluetooth, radio frequency wireless transmission, and infrared. Bluetooth, though providing highly confidential and stable transmission, suffers from a serious high delay problem, and cannot perform a multiplexing transmission. Bluetooth is also limited as to the audio transmission. The radio frequency wireless transmission, though being capable of performing a multiplexing transmission and having a high signal-to-noise ratio and a long transmission distance, is likely to be interfered by surrounding environment and thus transmits intermittent audio. The infrared transmission technology emits wireless signals that do not pass through a wall and are not likely to be intercepted by others. Compared with the wireless signals emitted by Bluetooth and radio frequency wireless transmission, the wireless signals emitted by the infrared transmission technology have less delay, and thus become one of the optimal choices used for transmitting audio in an enclosed environment, such as a car and a room.

However, the wireless signals emitted by the infrared transmission technology have a low signal-to-noise ratio and a high background white noise. Accordingly, reception circuits that are used to receive the wireless signals are required to be adjusted individually, in order to increase the signal-to-ratio of the wireless signals received. Besides, additional external elements are needed to implement the reception circuits.

Therefore, how to provide an infrared reception method and an infrared reception circuit that is not required to be adjusted during a production process and does not need additional elements is becoming one of the most urgent issues in the art.

SUMMARY OF THE INVENTION

In order to solve the problems of the prior art, the present invention provides an infrared reception circuit, comprising: an infrared receiver for receiving infrared signals and converting the infrared signals into analog signals; an amplifier electrically connected to the infrared receiver for receiving and amplifying the analog signals from the infrared receiver; an analog/digital converter electrically connected to the amplifier for converting the amplified analog signals into digital signals; a digital filter electrically connected to the analog/digital converter for filtering the digital signals via respective frequency bands; a digital frequency-adjusting demodulator electrically connected to the digital filter for demodulating the filtered digital signals into digital audio frequency signals; and a digital/analog converter electrically connected to the digital frequency-adjusting demodulator for converting the digital audio frequency signals into analog audio signals.

The present invention further provides an infrared reception method, comprising: receiving infrared signals and converting the infrared signals into analog signals; amplifying the analog signals; converting the amplified analog signals into digital signals; filtering the digital signals via respective frequency bands; demodulating the filtered digital signals into digital audio frequency signals; and converting the digital audio frequency signals into analog audio signals.

Compared with the prior art, the infrared reception circuit and the infrared reception method according to the present invention do not need a convention filter that is composed of resistors and capacitors, and consume less elements that are used in a conventional infrared reception circuit. Therefore, the infrared reception circuit according to the present invention has a simplified manufacturing process and a high yield rate. Besides, the infrared reception circuit according to the present invention is not required to be adjusted during the manufacturing process, and thus the product yield is increased.

BRIEF DESCRIPTION OF DRAWINGS

The invention can be more fully understood by reading the following detailed description of the preferred embodiments, with reference made to the accompanying drawings, wherein.

DETAILED DESCRIPTION OF THE INVENTION

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
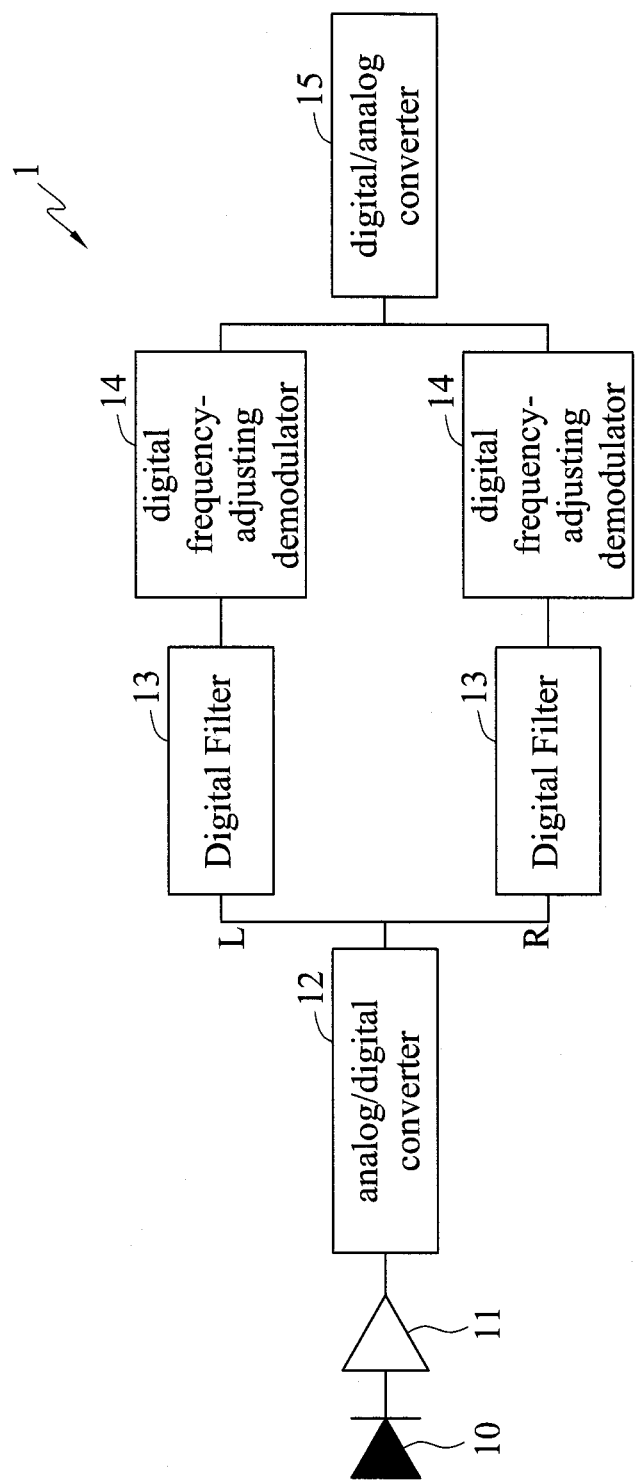
FIG. 1 is an schematic diagram of an infrared reception circuit of a first embodiment according to the present invention.

FIG. 1 is a schematic diagram of an infrared reception circuit 1 of a first embodiment according to the present invention. The infrared reception circuit 1 comprises an infrared receiver 10, an amplifier 11, an analog/digital converter 12, a digital filter 13, a digital frequency-adjusting demodulator 14, and a digital/analog converter 15.

The infrared receiver 10 receives external infrared signals, converts the infrared signals into analog signals, and transmits the analog signals to the amplifier 11.

The amplifier 11 is electrically connected to the infrared receiver 10, receives the analog signals transmitted from the infrared receiver 10, amplifies the analog signals, and transmits the amplified analog signals to the analog/digital converter 12.

The analog/digital converter 12 is electrically connected to the amplifier 11, converts the amplified analog signals into digital signals, and transmits the digital signals to the digital filter 13, optionally via another amplifier (not shown).

In an embodiment, the digital filter 13 is a finite impulse response (FIR) digital filter. The digital filter 13 is electrically connected to the analog/digital converter 12, filters the digital signals via respective frequency bands, and transmits the filtered digital signals to the digital frequency-adjusting demodulator 14. Therefore, the infrared reception circuit 1 according to the present invention can still act as a filter, even without resistors and capacitors installed, and can thus be integrated into an integrated circuit fabricating process. The yield rate is increased, and the infrared reception circuits are not required to be adjusted individually to achieve an optimal reception state. In an embodiment, the digital filter 13 is disposed on a left channel L and a right channel R, and filters the digital signals via two respective frequency bands. In another embodiment, the digital filter 13 is disposed on a plurality of channels, and filters the digital signals via the plurality of respective frequency bands.

The digital frequency-adjusting demodulator 14 is electrically connected to the digital filter 13, demodulates the digital signals into digital audio frequency signals, and transmits the digital audio frequency signals to the digital/analog converter 15.

The digital/analog converter 15 is electrically connected to the digital frequency-adjusting demodulator 14, and converts the digital audio frequency signals into analog audio signals.

Figure 2:
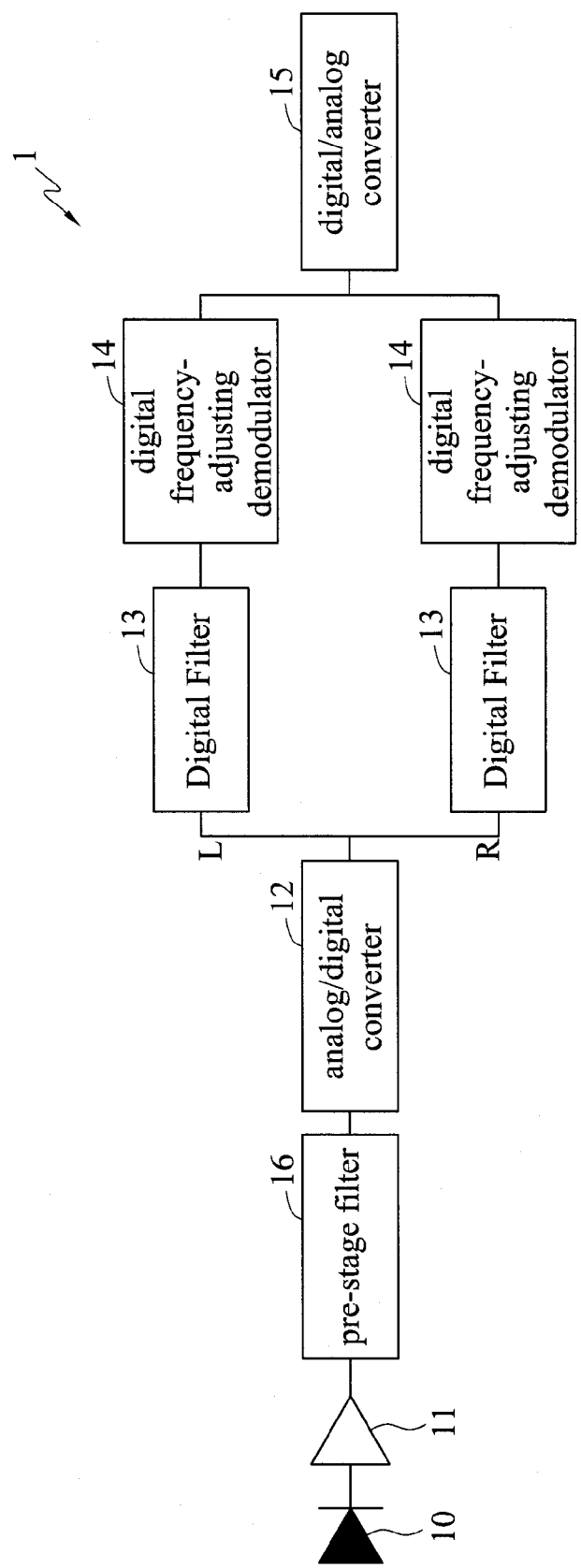
FIG. 2 is an schematic diagram of an infrared reception circuit of a second embodiment according to the present invention.

FIG. 2 is a schematic diagram of an infrared reception circuit 1 of a second embodiment according to the present invention. In the second embodiment, the infrared reception circuit 1 further comprises a pre-stage filter 16 electrically connected between the amplifier 11 and the analog/digital converter 12, and the pre-stage filter 16 filters the amplified analog signals and transmits the amplified analog signals to the analog/digital converter 12.

Figure 3:
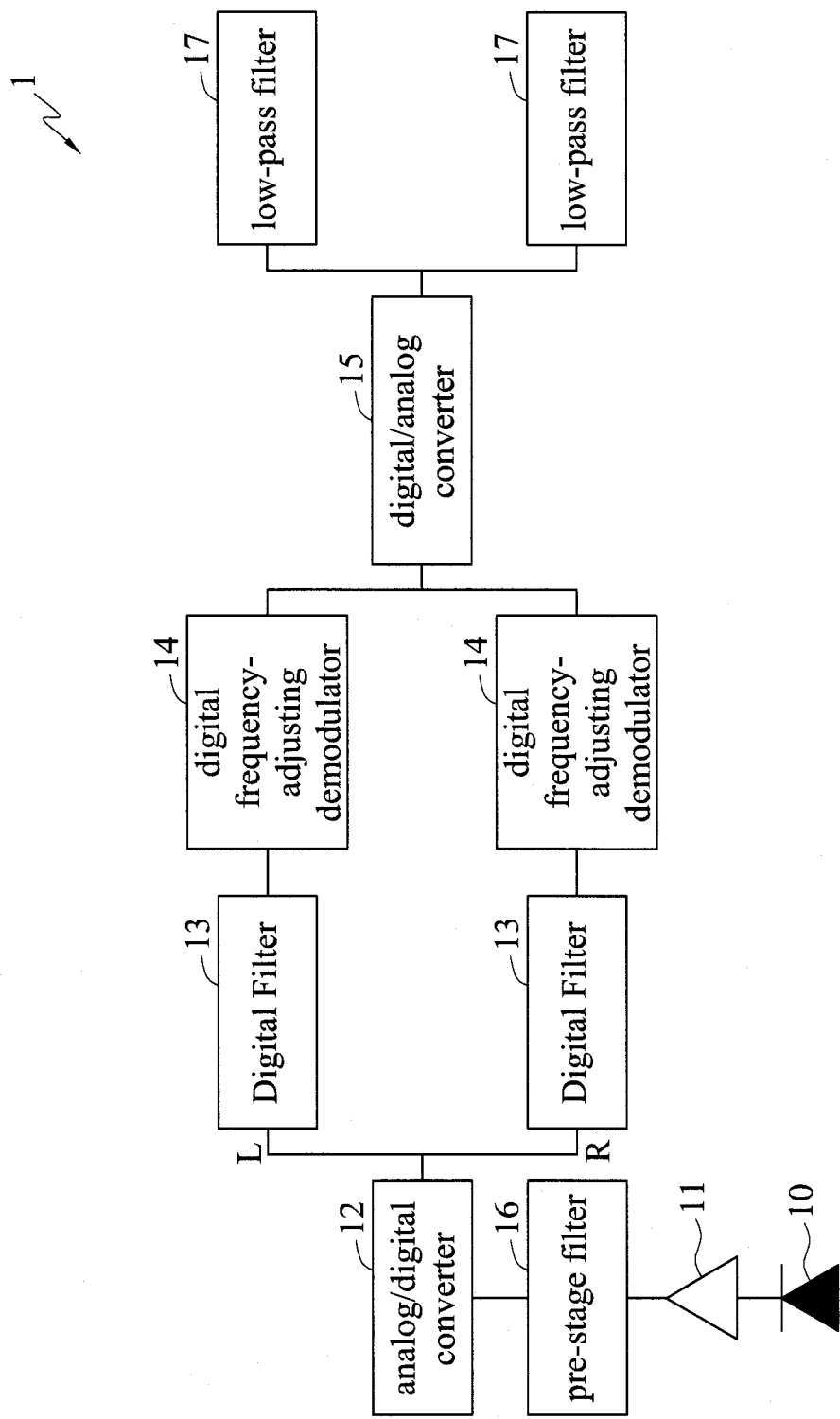
FIG. 3 is an schematic diagram of an infrared reception circuit of a third embodiment according to the present invention.

FIG. 3 is a schematic diagram of an infrared reception circuit 1 of a third embodiment according to the present invention. In the third embodiment, the infrared reception circuit 1 further comprises a low-pass filter 17 electrically connected to the digital/analog converter 15, and the low-pass filter 17 filters the analog audio signals to amplify the filtered analog audio signals, in order to drive an external audio display device (not shown), such as earphones or speakers.

Figure 4:
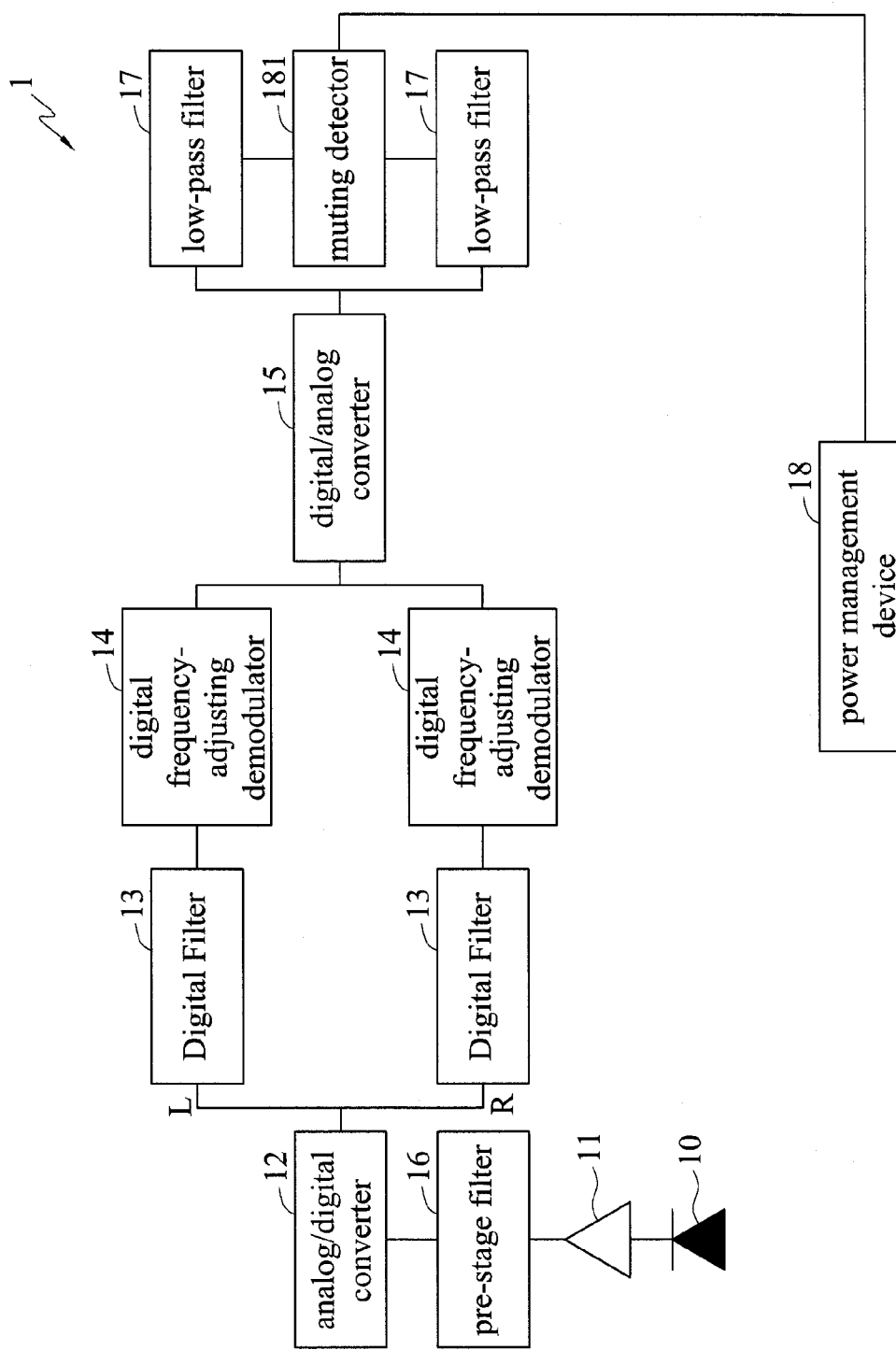
FIG. 4 is an schematic diagram of an infrared reception circuit of a fourth embodiment according to the present invention.

FIG. 4 is a schematic diagram of an infrared reception circuit 1 of a fourth embodiment according to the present invention. In the fourth embodiment, infrared reception circuit 1 further comprises a power management device 18 that manages (turn on or turn off) power supplied to the infrared reception circuit 1.

In an embodiment, the infrared reception circuit 1 further comprises a muting detector 181 electrically connected to the power management device 18, and the muting detector 181 enables the power management device 18 to stop supplying power to the infrared reception circuit when detecting that the infrared reception circuit 1 does not stay in a muting state for a predetermined time period (e.g., 10 minutes), and enables the power management device 18 to supply power to the infrared reception circuit 1 when detecting that the infrared reception circuit 1 does not stay in the muting state.

Figure 5:
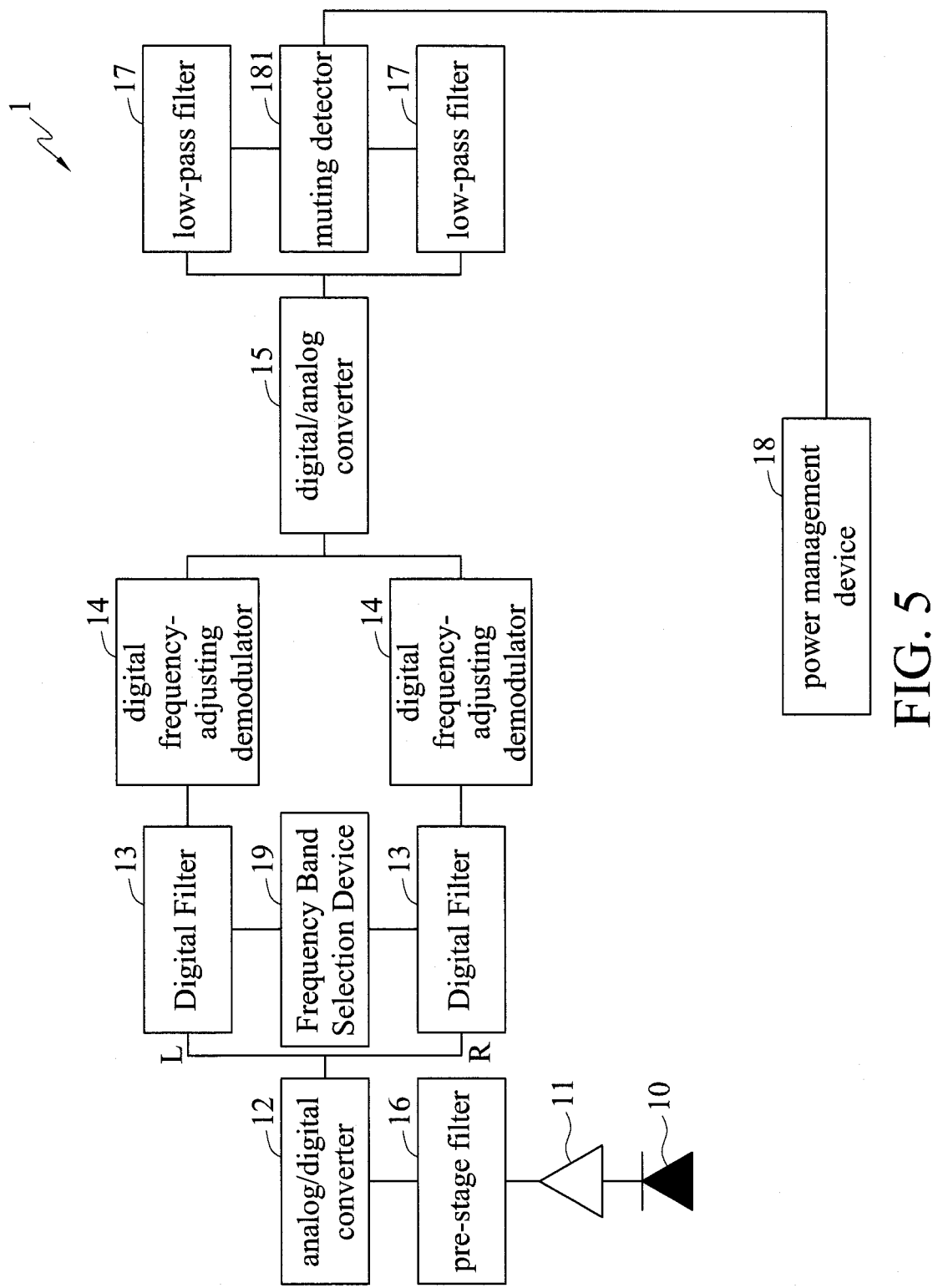
FIG. 5 is an schematic diagram of an infrared reception circuit of a fifth embodiment according to the present invention.

FIG. 5 is a schematic diagram of an infrared reception circuit 1 of a fifth embodiment according to the present invention. In the fifth embodiment, the infrared reception circuit 1 further comprises a frequency band selection device 19 electrically connected to the digital filter 13, and the frequency band selection device 19 selects required respective frequency bands among the digital signals and transmits the selected respective frequency bands to the digital filter 13. In an embodiment, the required respective frequency bands are, but not limited to, 2.3/2.8 MHz, 3.2/3.8 MHz, 4.3/4.8 MHz or 5.3/5.7 MHz. In an embodiment the frequency band selection device 19 employs a plurality of single-pole double-throw switches to select the required respective frequency bands. In an embodiment, the frequency band selection device 19 has two single-pole double-throw switches. When the two switches are both On, 2.3/2.8 MHz is selected as one of two respective frequency bands of the left and right channels. When the two switches are On and Off, respectively, 3.2/3.8 MHz is selected as one of two respective frequency bands of the left and right channels. When the two switches are Off and On, respectively, 4.3/4.8 MHz is selected as one of two respective frequency bands of the left and right channels. When the two switches are both Off, respectively, 5.3/5.7 MHz is selected as one of two respective frequency bands of the left and right channels.

Figure 6:
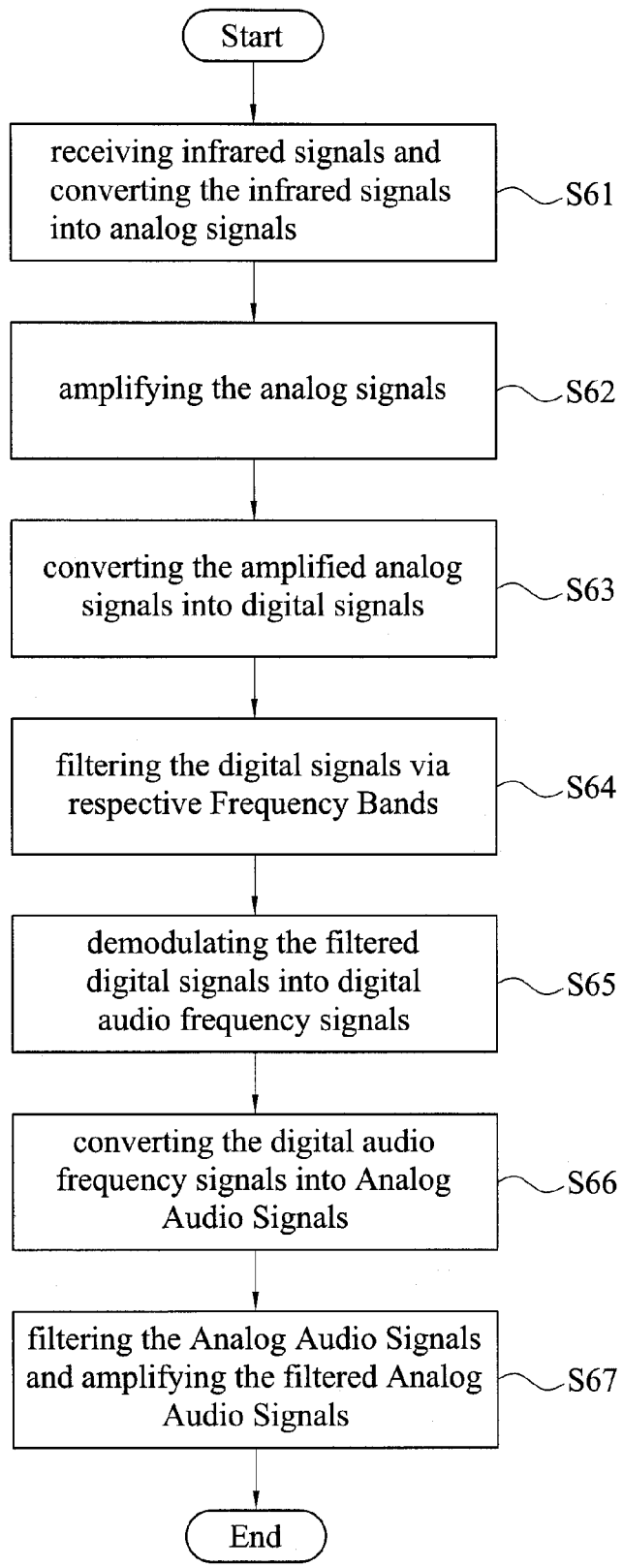
FIG. 6 is a flow chart of an infrared reception method according to the present invention.

FIG. 6 is a flow chart of an infrared reception method according to the present invention.

In step S61, infrared signals are received and converted into analog signals. Proceed to step S62.

In step S62, the analog signals are amplified. Proceed to step S63.

In step S63, the amplified analog signals are converted into digital signals. Proceed to step S64.

In step S64, the digital signals are filtered via respective frequency bands, e.g., via at least two respective frequency bands. Proceed to step S65.

In step S65, the filtered digital signals are demodulated into digital audio frequency signals. Proceed to step S65.

In step S66, the digital audio frequency signals are converted into analog audio signals. Proceed to step S67.

In step S67, the analog audio signals are filtered and amplified, in order to drive an audio display device.

In sum, an infrared reception circuit and an infrared reception method according to the present invention do not need a convention filter that is composed of capacitors and resistors. Accordingly, a variety of elements, such as a low noise amplifier (LNA), a band-pass filter (BPF), an LC tank and a power amplifier (PA) can be omitted. Therefore, the infrared reception circuit according to the present invention has a simplified fabricating process and an increased yield rate, does not require to be adjusted during the fabricating process, and has a high product yield.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. An infrared reception circuit, comprising:
an infrared receiver for receiving infrared signals and converting the infrared signals into analog signals;

an amplifier electrically connected to the infrared receiver for receiving and amplifying the analog signals from the infrared receiver;

an analog/digital converter electrically connected to the amplifier for converting the amplified analog signals into digital signals;

a plurality of digital filters electrically connected to the analog/digital converter for filtering the digital signals via respective frequency bands;

a plurality of digital frequency-adjusting demodulators electrically connected to the digital filters for demodulating the filtered digital signals into digital audio frequency signals via the respective frequency bands; and a digital/analog converter electrically connected to the digital frequency-adjusting demodulator for converting the digital audio frequency signals into analog audio signals.

2. The infrared reception circuit of claim 1, further comprising a pre-stage filter electrically connected between the amplifier and the analog/digital converter for filtering the amplified analog signals.

3. The infrared reception circuit of claim 1, further comprising a low-pass filter electrically connected to the digital/analog converter for filtering the analog audio signals to further amplify the filtered analog audio signals.

4. The infrared reception circuit of claim 1, further comprising a power management device for managing power supplied to the infrared reception circuit.

5. The infrared reception circuit of claim 4, further comprising a muting detector electrically connected to the power management device for enabling the power management device to stop supplying power to the infrared reception circuit after detecting that the infrared reception circuit stays in a muting state for a predetermined time period.

6. The infrared reception circuit of claim 1, further comprising a frequency band selection device electrically connected to the digital filter for selecting the required respective frequency bands and transmitting the selected respective frequency bands to the digital filter.

7. The infrared reception circuit of claim 6, wherein the respective frequency bands are 2.3/2.8 MHz, 3.2/3.8 MHz, 4.3/4.8 MHz or 5.3/5.7 MHz.

8. The infrared reception circuit of claim 1, wherein the digital filter is a finite impulse response digital filter.

9. The infrared reception circuit of claim 1, wherein the digital filter filters the digital signals via at least two respective frequency bands.

10. An infrared reception method, comprising:
receiving infrared signals and converting the infrared signals into analog signals;
amplifying the analog signals;
converting the amplified analog signals into digital signals;
filtering the digital signals via respective frequency bands;
demodulating the filtered digital signals into digital audio frequency signals via the respective frequency bands; and
converting the digital audio frequency signals into analog audio signals.

11. The infrared reception method of claim 10, wherein the digital signals are filtered via at least two respective frequency bands.

12. The infrared reception method of claim 10, further comprising filtering the analog audio signals to amplify the filtered analog audio signals.

* * * * *